United States Patent

Krocheski et al.

[15] 3,666,968

[45] May 30, 1972

[54] LOW LEVEL PULSE POLARITY DETECTOR

[72] Inventors: Thomas L. Krocheski, Burnsville; Samuel A. Meddaugh, St. Paul; John W. Staubus, Minneapolis, all of Minn.

[73] Assignee: Sperry Rand Corporation, New York, N.Y.

[22] Filed: Sept. 4, 1970

[21] Appl. No.: 69,809

[52] U.S. Cl. ..............................307/236, 307/215, 307/291, 328/118

[51] Int. Cl. ..............................H03k 19/36

[58] Field of Search ..............................307/236, 291, 215, 218; 328/118

[56] References Cited

UNITED STATES PATENTS

| | | | |
|---|---|---|---|
| R26,082 | 9/1966 | Osborne | 307/291 |
| 3,553,491 | 1/1971 | Schulz | 307/236 |

*Primary Examiner*—Donald D. Forrer
*Assistant Examiner*—David M. Carter
*Attorney*—Kenneth T. Grace, Thomas J. Nikolai and John P. Dority

[57] ABSTRACT

A semiconductor circuit for determining the relative polarity of the output of a binary memory system is described. The circuit includes four NAND circuits intercoupled as a flip-flop driving two NAND circuits intercoupled as strobed output gates. The relative polarity of the memory system output signal sets the flip-flop in a corresponding one of its two stable states with the strobed output gates emitting the binary significance of the memory system output signal.

9 Claims, 5 Drawing Figures

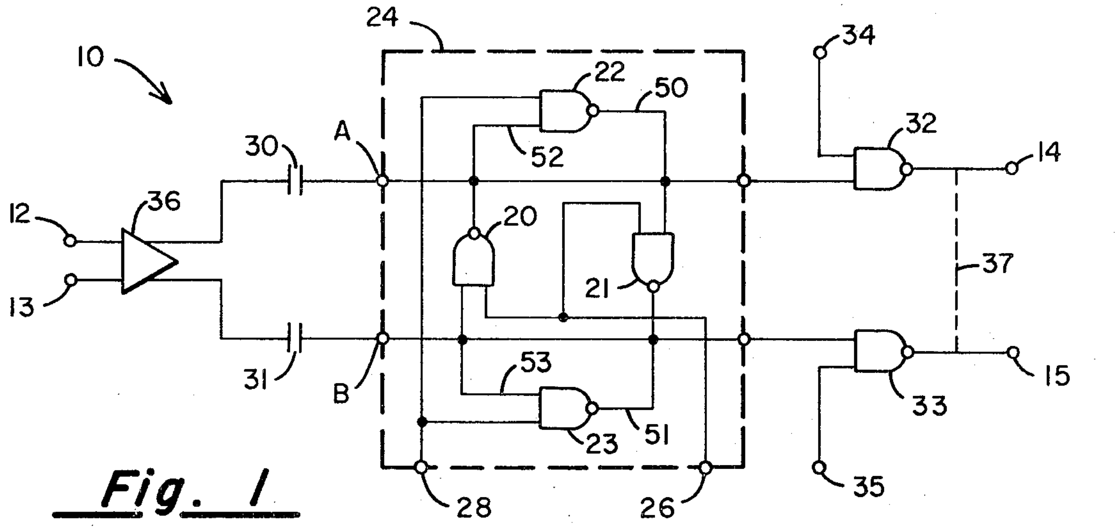
Fig. 1
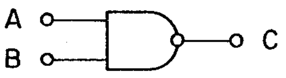
Fig. 3a
| A | B | C |
|---|---|---|
| 1 | 1 | 0 |
| 1 | 0 | 1 |
| 0 | 1 | 1 |
| 0 | 0 | 1 |
"1" ≅ +2.5V ⇒ POSITIVE
"0" ≅ +0.3V ⇒ NEGATIVE
Fig. 3b
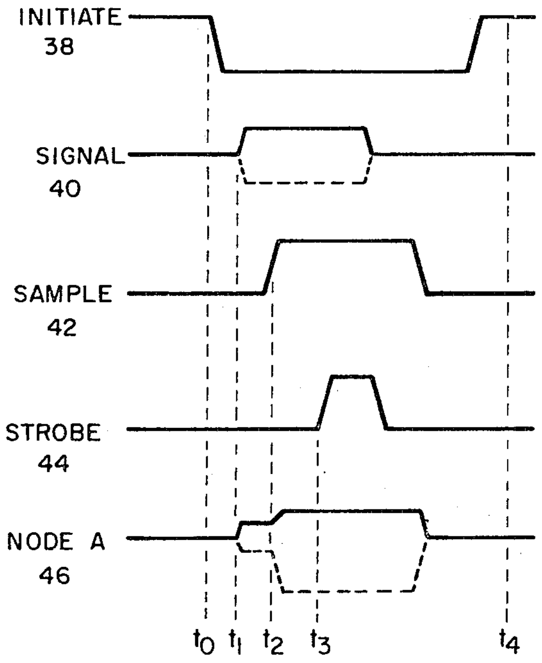
Fig. 2
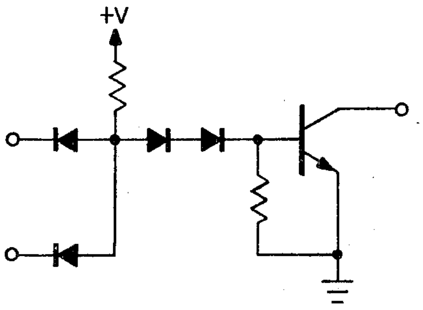
Fig. 3c
INVENTORS
THOMAS L. KROCHESKI
SAMUEL A. MEDDAUGH
JOHN W. STAUBUS
BY Kenneth T. Grace
ATTORNEY

LOW LEVEL PULSE POLARITY DETECTOR

BACKGROUND OF THE INVENTION

The invention herein described was made in the course of or under a contract or subcontract thereunder with the Department of the Navy.

Semiconductor circuits for the determination of the relative polarity of a binary memory output signal have, in the past, involved the detection of a voltage differential that is of sufficient amplitude to forward bias the base-emitter junction of a transistor from an initial reverse biased condition, or vice versa. The voltage differential between that sufficient to reverse bias and that sufficient to forward bias such base-emitter junction, although of a small magnitude as compared to vacuum tube technology, is, in the case of memory systems of inherently low level output signal amplitudes, often too insensitive to reliably operate with present day low level memory systems that incorporate thin-ferromagnetic-film memory elements—see the R. J. Bergman, et al. U.S. Pat. No. 3,435,435. Such a prior art semiconductor circuit is disclosed in the S. Bernfeld, et al. U.S. Pat. No. 3,218,478.

SUMMARY OF THE INVENTION

The present invention is directed toward an arrangement of semiconductor constructed NAND circuits using diode-transistor logic (DTL) for determining the relative polarity of an input signal. The input signal, which is the output of a bipolar memory system, as representing the readout of a "1" or a "0," is coupled across two input terminals which are capacitively coupled to the two common nodes of the two sides of a flip-flop that is formed by two cross-coupled latching NAND circuits while the two common nodes are additionally coupled to associated strobe NAND circuits that function as output terminals. Two feedback NAND circuits are each coupled across the associated common node by an input terminal and an output terminal and are normally operating mid-way between their two stable states providing equal input bias for the two latching NAND circuits. The input signal offsets the bias such that the two latching NAND circuits switch into an associated one of the flip-flop's two stable states. The state of the flip-flop is then strobed at the strobe NAND circuits to indicate the relative polarity of the input signal, and, correspondingly, the readout of a "1" or a "0" of the memory system.

BRIEF DESCRIPTION OF THE DRAWINGS

FIG. 1 is a block diagram of a polarity detector of the present invention.

FIG. 2 is a timing diagram of the signals associated with the operation of the polarity detector of FIG. 1.

FIGS. 3*a*, *b*, *c* are the logic symbol, the truth table and the circuit schematic of the NAND circuit of FIG. 1.

DESCRIPTION OF THE PREFERRED EMBODIMENT

With particular reference to FIG. 1 there is presented a block diagram of the polarity detector of the present invention. Detector 10 includes a plurality of intercoupled NAND circuits that accept an input signal coupled across its input terminals 12, 13 and provide at its output terminals 14, 15 an output signal that is representative of the relative polarity of the input signal; i.e., whether the signal coupled to input terminal 12 or 13 is the relatively more positive signal level. In thin-ferromagnetic-film memory systems the input signal relative polarity is indicative of the readout of a "1" or a "0" with such relative polarities or signal level differentials being in the order of 3 to 1. The polarity detector 10 is designed to operate from a Mated-Film memory system, such as the Solid-Stack memory system of the R. J. Bergman, et al. U.S. Pat. No. 3,435,435 and to detect typical signal level differentials of 80.0 millivolts (MV).

Detector 10 includes two latching NAND circuits 20, 21 that are cross-coupled to form a flip-flop and two feedback NAND circuits 22, 23 that hold the two latching NAND circuits 20, 21 at their switching threshold of +1.4 volts. These NAND circuits 20, 21, 22, 23 are preferably formed on a single integrated circuit chip 24 whereby the circuit characteristics of all such NAND circuits are extremely evenly balanced especially with respect to their switching characteristics. With such balancing, detector 10 will operate at a signal level differential approaching zero, only the circuit imbalance providing the increase in detectable signal level differential. In production runs, detector 10 has reliably preformed at the above noted design typical signal level differential of 80 mv.

NAND circuits 20, 21 are cross-coupled with the output terminal of NAND circuit 20 and the input terminal of NAND circuit 21 directly coupled to node A, the output terminal NAND circuit 21 and an input terminal of NAND circuit 20 are directly coupled to node B while an input terminal of NAND circuits 20, 21 are directly intercoupled forming a sample terminal 26. Directly coupled or intercoupled when used herein shall mean that no discreet impedance or resistive devices are coupled intermediately. Input terminals of NAND circuits 22, 23 are directly intercoupled forming an initiate terminal 28 while the output terminal and an input terminal of NAND circuit 22 are directly coupled to node A and the output terminal and an input terminal of NAND circuit 23 are directly coupled to node B.

Node A is directly coupled to capacitor 30 and an input terminal of strobe NAND circuit 32 while node B is directly coupled to capacitor 31 and an input terminal of strobe NAND circuit 33. The other sides of capacitors 30, 31 are directly coupled to the output terminals of differential amplifier 36, and, accordingly, input terminals 12, 13 respectively. Strobe NAND circuits 32, 33, when strobed at their input terminals and strobe terminals 34, 35, respectively, provide at their output terminals 14, 15, respectively, signals that are representative of the states of latching NAND circuits 20, 21 as determined by the relative polarity of the input signal coupled across input terminals 12, 13.

With particular reference to FIG. 2 there is presented a timing diagram of the signals associated with detector 10 of FIG. 1. Initially, with a positive level initiate signal 38 coupled to terminal 28, feedback NAND circuits 22, 23 operate at their switching threshold of approximately 1.4 volts. This is because of the negative feedback due to their input terminals 50, 51 being directly coupled back to their input terminals 52, 53 at the respectively associated nodes A, B, respectively. With particular reference to FIGS. 3*a*, *b*, *c* there are presented the logic symbol, truth table and circuit schematic of the NAND circuits 20, 21, 22, 23, 32, 33 of FIG. 1. With the operating signal levels of +2.5 volts and +0.3 volts representative of logic "1" and "0" and described as positive and negative signal levels, respectively, this 1.4 volt signal level of nodes A, B is mid-way between the two normal or logic switching levels of +2.5 and +0.3 volts. NAND circuits 20, 21, 32, 33 are OFF and present no load to nodes A or B because both sample signal 42 and strobe signal 44 are negative at this time.

At time $t_0$ a negative level initiate signal 38 is coupled to terminal 28 turning feedback NAND circuits 22, 23 OFF. Capacitors 30, 31 having been charged to the 1.4 volt switching threshold by the action of the positive level initiate signal 38, hold nodes A, B near the switching threshold of 1.4 volts.

At time $t_1$ input signal 40 is coupled across input terminals 12, 13 of a low impedance differential amplifier 36, the output of which is capacitively coupled to nodes A, B by capacitors 30, 31. Input signal 40, e.g, drives node A more positive than node B.

At time $t_2$ a positive level sample signal 42 is coupled to terminal 26 causing both input terminals of latching NAND circuit 21 to go positive. This couples a negative signal to its output terminal and node B. This is a latching action forcing the flip-flop, formed by the cross-coupled latching NAND circuits 20, 21, to latch in its stable state with latch NAND circuit 21

ON and with latch NAND circuit 20 OFF as node A is relatively more positive than node B. Of course, if at time $t_1$ input signal 40 would have driven node B more positive than node A the opposite effect would have occured This would have turned latch NAND circuit 21 OFF and latch NAND circuit 21 ON—see the dashed lines of input signal 40 and node A signal 46.

After the flip-flop is latched, as at time $t_3$, a positive strobe pulse may be coupled to input terminal 34 or 35 of strobe NAND circuits 32 or 34. With node A relatively positive and node B relatively negative, strobe NAND circuit 32 would couple a relatively negative signal indicative of a "0" to output terminal 14 while strobe NAND circuit 33 would couple a relatively positive signal indicative of a "1" to output terminal 15. Alternatively, output terminals 14, 15 could be directly intercoupled by conductor 37 forming a single output terminal from which both output signals could be selectively emitted by the selective coupling of strobe signal 44 to terminal 34 or 35.

After the data, or output, signal has been strobed out, initiate signal 38 is returned to its initial positive level and sample signal 42 and strobe signal 44 are returned to their initial negative level, such as at time $t_4$. This allows nodes A and B to recharge to their initial switching threshold of 1.4 volts. While the initiate signal 38 is at its positive level a fast recharge path is provided for capacitors 30, 31 by the low output impedance of differential amplifier 36 on one side and by switching NAND circuits 32, 33 on the other side which appear as very low impedance devices because of the large negative feedback through their directly intercoupled output terminal and input terminal.

What is claimed is:

1. A low level pulse polarity detector, comprising:
first, second, third and fourth NAND circuits, each having an output terminal and first and second input terminals;
first and second capacitors, each having first and second terminals;
means for coupling said first and second capacitors' first terminals across a signal source;
means for directly intercoupling the first input terminals of said first and fourth NAND circuits and the output terminals of said first and third NAND circuits to said first capacitor's second terminal;
means for directly intercoupling the first input terminals of said second and third NAND circuits and the output terminals of said second the fourth NAND circuits to said second capacitor's second terminal;
means for directly intercoupling the second input terminals of said third and fourth NAND circuits;
means for directly intercoupling the second input terminals of said first and second NAND circuits;
means for directly intercoupling the second terminals of said first and second capacitors to an output means;
means for sensing the relative signal level of said first or second capacitor's second terminal at said output means.

2. A low level pulse polarity detector, comprising:
first, second, third and fourth NAND circuits, each having an output terminal and first and second input terminals;
means for coupling first and second nodes across a signal source;
means for directly intercoupling the first input terminals of said first and fourth NAND circuits and the output terminals of said first and third NAND circuits to said first node;
means for directly intercoupling the first input terminals of said second and third NAND circuits and the output terminals of said second and fourth NAND circuits to said second node;
means for directly intercoupling the second input terminal of said third and fourth NAND circuits;
means for directly intercoupling the second input terminals of said first and second NAND circuits;
means directly intercoupling said first and second nodes to an output means for sensing the state of said third or fourth NAND circuit as a function of the relative polarity of an input signal coupled across said first and second nodes.

3. A low level pulse polarity detector, comprising:
first, second, third, fourth, fifth and sixth NAND circuits, each having an output terminal and first and second input terminals;
first and second capacitors, each having first and second terminals;
means for coupling said first and second capacitors' first terminals across a signal source;
means for directly intercoupling the first input terminals of said first, fourth and fifth NAND circuits and the output terminals of said first and third NAND circuit to said first capacitors' second terminal;
means for directly intercoupling the first input terminals of said second, third and sixth NAND circuits and the output terminals of said second and fourth NAND circuits to said second capacitors' second terminal;
means for directly intercoupling the second input terminal of said third and fourth NAND circuits to a sample terminal;
means for directly intercoupling the second input terminals of said first and second NAND circuits to an initiate terminal;
means for directly intercoupling the output terminals of said fifth and sixth NAND circuits to a data out terminal;
means coupling the second input terminal of said fifth NAND circuit to a normal strobe terminal;
means coupling the second input terminal of said sixth NAND circuit to a complement strobe terminal.

4. A low level pulse polarity detector, comprising:
first and second substantially similar latching circuits, each having an output terminal and first and second input terminals;
first and second substantially similar feedback circuits, each having an output terminal and first and second input terminals;
first and second separate electrical nodes which serve as both input and output terminals across which an input signal is coupled and at which an output signal is detected;
means for directly intercoupling the first input terminals of said first feedback circuit and said second latching circuit and the output terminals of said first feedback circuit and said first latching circuit to said first node;
means for directly intercoupling the first input terminals of said second feedback circuit and said first latching circuit and the output terminals of said second feedback circuit and said second latching circuit to said second node;
means for directly intercoupling the second input terminals of said first and second latching circuits to a sample signal terminal;
means for directly intercoupling the second input terminals of said first and second feedback circuits to an initiate signal terminal; and,
input means for coupling an input signal across said input terminals for latching said first and second latching circuits ON and OFF or OFF and ON, respectively, as a function of the relative input signal level across said first and second nodes.

5. The detector of claim 4 in which said latching circuits and said feedback circuits are substantially similar diode-transistor logic NAND circuits.

6. The detector of claim 5 in which all said circuitry is formed on a single integrated circuit chip.

7. The detector of claim 4 in which said input means includes first and second capacitors for serially coupling said input signal across said first and second input terminals, respectively.

8. The detector of claim 4 further including:
first and second substantially similar strobe circuits, each having an output terminal and first and second input terminals;

means for directly intercoupling the first input terminal of said first strobe circuit to said first node;

means for directly intercoupling the first input terminal of said second strobe circuit to said second node; and, strobe means coupled to the second input terminals of said first and second strobe circuits for providing on their output terminals signals that are representative of the states of said first and second latching circuits.

9. The detector of claim 4 further including:

an initiate terminal directly coupled to the directly intercoupled second input terminals of said first and second feedback circuits for receiving an initiate signal turning said first and second feedback circuits OFF; and, a sample terminal directly coupled to the directly intercoupled second input terminals of said first and second latching circuits for receiving a sample signal and latching said first and second latching circuits ON and OFF or OFF and ON, respectively, as a function of the relative input signal level across said first and second nodes while said initiate signal is concurrently coupled to said initiate terminal.

* * * * *

UNITED STATES PATENT OFFICE
CERTIFICATE OF CORRECTION

Patent No. 3,666,968 Dated May 30, 1972

Inventor(s) Thomas L. Krocheski et al

It is certified that error appears in the above-identified patent and that said Letters Patent are hereby corrected as shown below:

Column 3, line 46, before "fourth", "the" should read -- and --.

Signed and sealed this 12th day of December 1972.

(SEAL)
Attest:

EDWARD M.FLETCHER,JR.
Attesting Officer

ROBERT GOTTSCHALK
Commissioner of Patents